(12) United States Patent
Sharma et al.

(10) Patent No.: US 8,611,851 B2
(45) Date of Patent: Dec. 17, 2013

(54) ACCOUNTING REQUEST PROCESSING IN A COMMUNICATION NETWORK

(75) Inventors: Ranjan Sharma, New Albany, OH (US); Goutam Sinha, Naperville, IL (US)

(73) Assignee: Alcatel Lucent, Paris (FR)

( * ) Notice: Subject to any disclaimer, the term of this patent is extended or adjusted under 35 U.S.C. 154(b) by 161 days.

(21) Appl. No.: 12/961,098

(22) Filed: Dec. 6, 2010

(65) Prior Publication Data

US 2011/0207431 A1    Aug. 25, 2011

Related U.S. Application Data

(60) Provisional application No. 61/306,368, filed on Feb. 19, 2010.

(51) Int. Cl.
*H04M 11/00* (2006.01)
(52) U.S. Cl.
USPC .......................................... 455/406; 455/405
(58) Field of Classification Search
USPC ................................. 455/405, 406
See application file for complete search history.

(56) References Cited

U.S. PATENT DOCUMENTS

| | | | | |
|---|---|---|---|---|
| 2004/0098612 | A1* | 5/2004 | Lee et al. | 713/200 |
| 2004/0167791 | A1* | 8/2004 | Rodrigo et al. | 705/1 |
| 2009/0215429 | A1* | 8/2009 | Caldwell et al. | 455/406 |
| 2009/0253405 | A1* | 10/2009 | Yang | 455/406 |

* cited by examiner

*Primary Examiner* — Kwasi Karikari
(74) *Attorney, Agent, or Firm* — A. Ralston

(57) ABSTRACT

A system and method for accounting request processing in a communication network. When an accounting request is received in a correlating network element from a service-monitoring element, it is stored unless and until the associated service has been completed. When a final accounting request associated with the service has been received, a processing track is determined; one of two or more preferably each associated with a different processing rate. Once a processing track has been assigned, each ACR is placed in a queue for processing; there are multiple queues, each associated with one or more processing tracks. In a preferred embodiment, the backlog of a queue, or of multiple queues, is considered when queuing an ACR. The backlog may be monitored and ACRs may be reassigned to a different queue, or the processing rate of a queue may be adjusted, so that ACRs may be processed at a higher (or lower) rate.

21 Claims, 5 Drawing Sheets

ACCOUNTING REQUEST PROCESSING IN A COMMUNICATION NETWORK

CROSS-REFERENCE TO RELATED APPLICATIONS

The present disclosure is related to and claims priority from U.S. Provisional patent application Ser. No. 61/306,368, entitled Differential Accounting Request Processing at the CCF and filed on 19 Feb. 2010, the entire contents of which are incorporated by reference herein.

TECHNICAL FIELD

The present invention relates generally to the field of communication networks, and, more particularly, to a method and system for accounting request processing that is aimed at reducing the processing burden involved with producing charging records.

BACKGROUND

The following abbreviations are herewith defined, at least some of which are referred to within the following description of the state-of-the-art and the present invention.

| | |
|---|---|
| 3GPP | 3$^{rd}$ Generation Partnership Project |
| ACR | Accounting Request |
| CCF | Charging Collection Function |
| CDR | Charging Data Records |
| CTF | Charging Trigger Function |
| GW | Gateway |
| HRPD | High Rate Packet Data |
| HSGW | HRPD Serving GW |
| IETF | Internet Engineering Task Force |
| IMS | IP Multimedia Subsystem |
| LTE | Long Term Evolution |
| OCS | Online Charging System |
| PDN | Packet Data Network |
| QoS | Quality of Service |
| S-GW | Serving GW |

Many consumers use services available through a communication network. The most common, of course, is simple voice or telephone calls. Other services may include, for example, text messaging, the downloading of content or streaming video, or interacting with Web sites accessible through the Internet. While some of these services may be offered free of charge, at least to the user, others must be paid for.

A consumer who pays for services provided through a communication network may be referred to as a subscriber. The subscriber may be required to pay for certain services in advance, for example by credit card, or may be allowed to obtain the services and be billed for them later. In some cases the subscriber may be required to maintain an account balance that service charges may be billed against.

In many cases, charging for the services provided by a network is done on a use-based basis. The more of the services used by the subscriber, the higher the charges will be. Many and various billing schedules are now in use, for example to allow a certain usage level for a fixed rate, then charging on a per-service-unit basis above that threshold. A common service unit is time; the duration of a telephone call in minutes, for example. Other services may be billed on the basis of how much data is transmitted.

In these cases, the network must monitor the service used and perform certain accounting functions. This may be true even in networks that charge only a flat monthly fee, if they nevertheless want to track service consumption for other purposes. As might be expected, standard protocols for network accounting have been developed. In a standard model, a network gateway or similar component receives a service request from a subscriber (or, more accurately, with a UE device associated with a subscriber) and performs some form of authentication and authorization function. If provision of the service is allowed, a service element, perhaps at the gateway, permits the service session to commence and monitors its progress. This service element, which may for example be a CTF in an LTE/IMS network, generates messages when the service begins and ends, and may also do so while session is on-going.

These messages may be called accounting requests and are eventually aggregated and correlated into a charging record. This is often performed by specific network element after a communication session has ended. In the LTE/IMS context, this element is a CDF, which produces a per-CTF aggregated CDR and a per-session correlated CDR based on the ACRs it receives from one or more CTFs that send accounting information for the call or session. Given the importance of the billing function, there are often strict requirements for how quickly this must be done. Unfortunately, processing of all of the accounting requests to produce aggregated and correlated charging records, especially if done in accordance with the severe timing requirements, consumes a great deal of processing power. There may be instances, however, where processing of accounting requests must be given a high priority.

Needed therefore is a manner of reducing the processing burden placed on the network by the processing of accounting requests, while still ensuring that important dependent downstream functions are not adversely impacted by processing delays.

Accordingly, there has been and still is a need to address the aforementioned shortcomings and other shortcomings associated with processing accounting requests. These needs and other needs are satisfied by the present invention.

SUMMARY

The present invention is directed to a manner of processing accounting requests for a communication network, for one example in an LTE/eHRPD/IMS environment. In one aspect, the present invention includes receiving an accounting request, for example an ACR from a CTF received at a CCF, determining a processing track for the accounting request, and assigning the accounting request to one of a plurality of processing queues based on the processing track determination. In most implementations, the processing queues include one queue for faster processing relative to the remainder of the plurality of queues, and one queue that is slower. In some embodiments, more than two queues are provided, and each may be associated with a different processing rate.

In some embodiments, the processing rate of a queue, or of multiple queues, may be varied. This may be accomplished by establishing a faster cycle for a return to the queue to process the next accounting request, or by assigning more threads in a multi-thread processing environment. In other embodiments, accounting requests assigned to one queue may be reassigned to another queue for faster (or slower) processing. The backlog of a queue, or of each queue, may be considered when assigning or reassigning accounting requests, or when adjusting the processing rate of each queue.

In another aspect, the present invention is a network element for processing accounting requests including a network-element processor, a memory device accessible by the processor, a network interface for receiving accounting requests from other network components, processing track determiner for associating ACRs with a processing track according to policy rules installed in the network element, and a plurality of processing queues into which ACRs are placed according to the processing track assigned.

Additional aspects of the invention will be set forth, in part, in the detailed description, FIGS. and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of accounting, and more specifically, of accounting request processing, in a communication network that charges for providing services to consumers. It is of particular advantage in networks operable to provide session-based services according to a Diameter protocol, but may be advantageously implemented in other environments as well. Some standards, for example 3GPP Diameter protocols, specify a maximum delay for processing accounting requests. The inventors have determined, however, that processing load is affected by the rate at which accounting requests must be processed, in some cases significantly. If this burden can be reduced, savings can be realized where the amount of hardware and software needed to meet the expected processing demand can be reduced.

Figure 1:
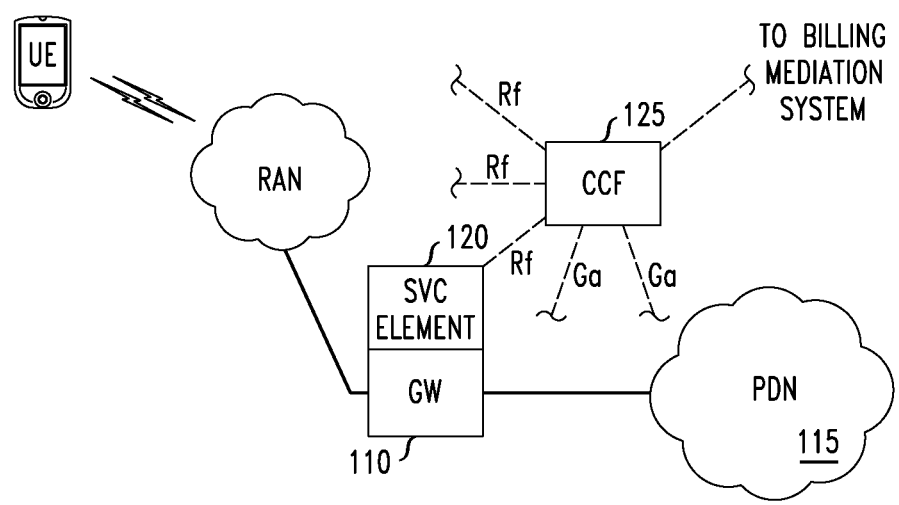
FIG. 1 is a simplified schematic diagram illustrating selected components of a communication network that may be configured according to an embodiment of the present invention.

FIG. 1 is a simplified schematic diagram illustrating selected components of a communication network that may be configured according to an embodiment of the present invention. The network if FIG. 1 is of course just one example of a communication network in which the present invention may be implemented; other variations are possible. Shown in FIG. 1 is a UE (user equipment) device 101, which in this embodiment requests to receive a service, for example a voice call, that will be provided via PDN 115. To receive this service, establish a communication session, UE 101 establishes a communication session with RAN 105, which includes a number of antennas and associated base stations for radio communications with UE 105 and other UEs. The antennas are typically spread out over a wide coverage area, and operate according to protocols that permit the communication session to be handed over from one antenna to the other without interruption.

In this embodiment, gateway 110 (which may also be considered a part of RAN 105) provides the data path from the RAN 105 to the PDN 115. Gateway 110 is part of or in communication with service element 120. Service element 120, which in this embodiment includes a CTF (not separately shown) is configured to monitor the service provided to UE 101 and send ACRs to CCF 125. As shown in FIG. 1, these ACRs are communicated using a standard Rf interface. Note, however, that communication with the CCF may take place using other interfaces as well; two instances of the Ga interface are depicted in FIG. 1 as an example.

In this embodiment, CCF 125 aggregates and correlates, as necessary, the ACR or ACRs received that are related to a particular service request to produce a CDR. CCF 125 sends this CDR to a billing mediation system (not shown) so that billing or other accounting functions may occur. Note that in some implementations, aggregated ACRs related to a single session are not (or not all) correlated to produce a single CDR; they may instead be simply sent to the billing mediation system for further processing.

Figure 1A:
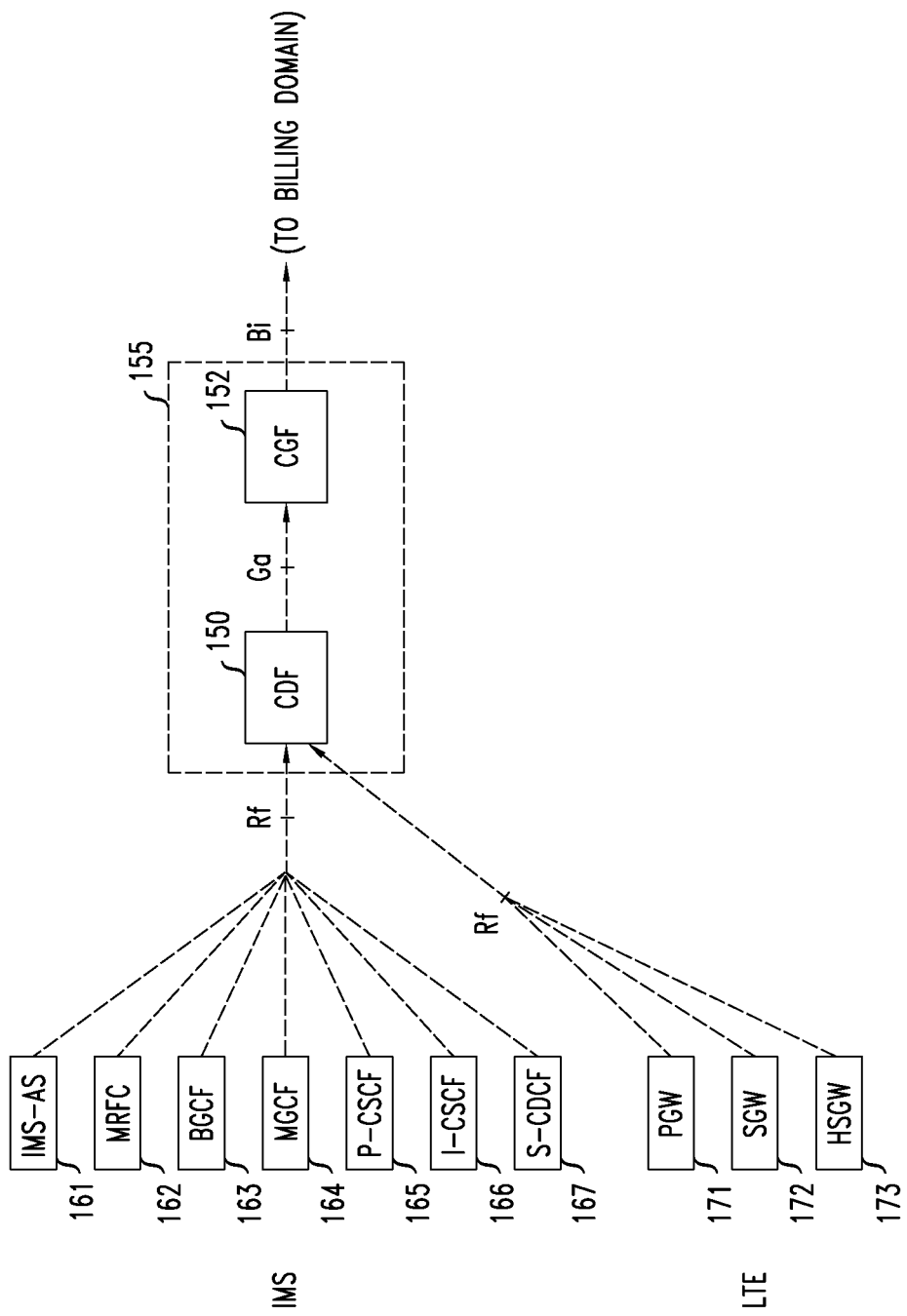
FIG. 1A is a simplified schematic diagram illustrating selected components of a communication network in such an environment that may be configured according to an embodiment of the present invention.

The present invention may be implemented in a LTE/IMS or an LTE/eHRPD/IMS environment. FIG. 1A is a simplified schematic diagram illustrating selected components of a communication network in such an environment that may be configured according to an embodiment of the present invention. Illustrated in FIG. 1A are a number of CTFs that operated generally within the IMS domain; IMS-AS 161, MRFC 162, BGCF 163, MGCF 164, P-CSCF 165, I-CSCF 166, and S-CSCF 167. As with service element 120 shown in FIG. 1, these all use an Rf interface to communicate ACRs to CDF 150. LTE elements that may also send ACRs to CDF 150 include PGW 171, SGW 172, and HSGW 173. In this embodiment, CDF 150 then transmits the ACRs to CGF 152 using a Ga interface. Note that here the CCF 155 includes both the CDF 150 and the CGF 152. CGF 152 then correlates session-related ACRs to produce a CDR (or multiple CDRs), which are then sent to the billing domain (not shown) using the Bi interface. Note also that the interfaces labeled in FIGS. 1 and 1A are exemplary, other interfaces may be used for communications according to the present invention as well.

As mentioned above, ACRs may be, and often are, sent for purposes other than billing. In this embodiment, for example, some of the components illustrated may send only ACRs that are used for purely charging purposes, while others may send ACRs only for tracking, diagnostic, or maintenance purposes. Other components may (separately) transmit ACRs for a number of different reasons. In accordance with this embodiment of the present invention, CDF 150 is operable to discriminate between different types of ACRs in order to determine a suitable processing track for each group of session-related ACRs. For example, purely charging-related ACRs from service element 120 may be placed on one track, while ACRs from another source may be placed on another. This process will described below in more detail.

Differential ACR processing may be desirable to promote the efficient use of network processing resources. As mentioned above, processing-rate requirements have a definite and in some cases very significant impact on the burden this operation imposes on the system. In implementation, however, some ACRs require rapid processing, while others do not. For example, in a network that allows unlimited calling for a fixed price, most operators do not place a high significance on the CDRs that are produced for billing purposes; the subscriber's actual bill is not affected. In other cases, however, the operator may be very interested in timely performance and fault monitoring, and may ask for a quicker turnaround on ACRs that are used for those purposes. The present invention provides a novel way of processing ACRs in an effort to both conserve network resources and provide timely reporting when needed.

Figure 2:
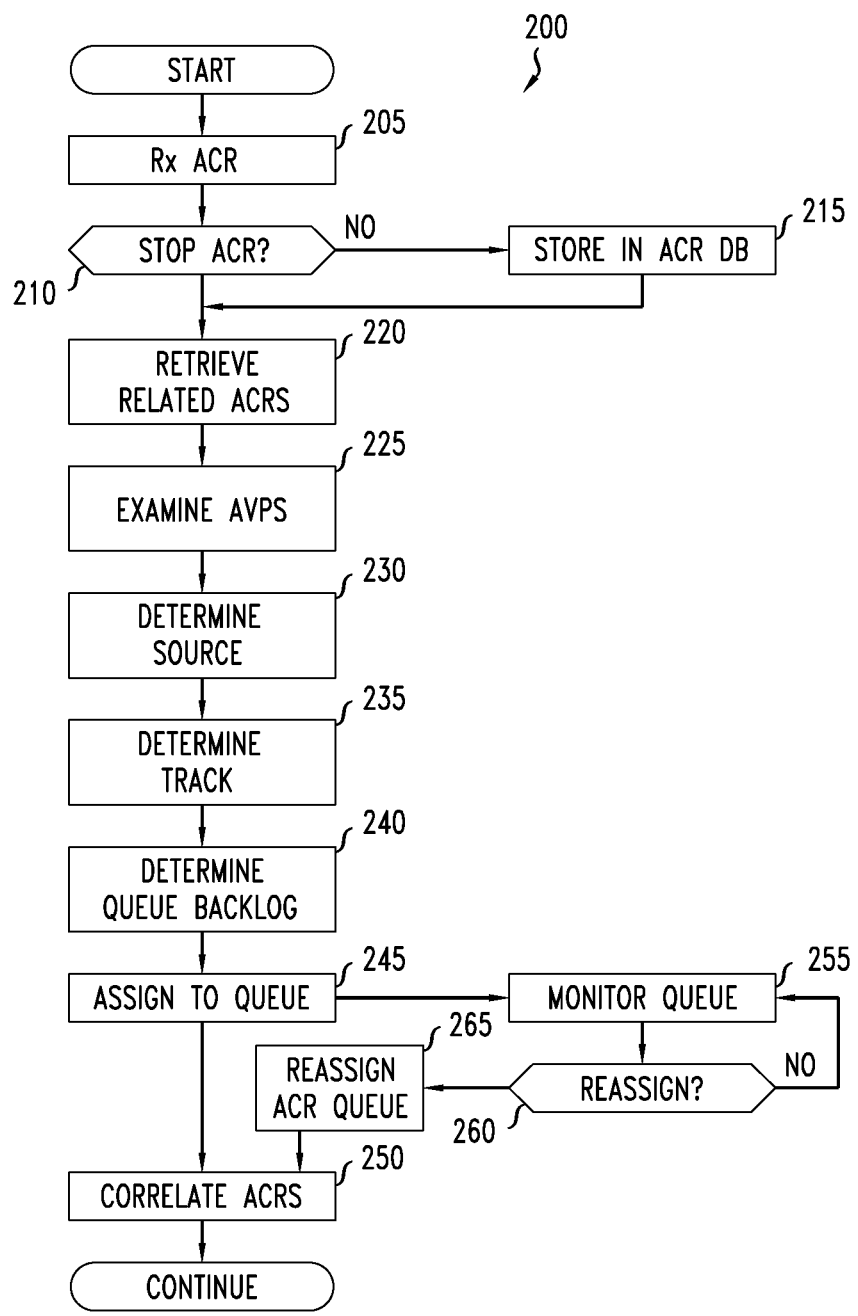
FIG. 2 is a flow diagram illustrating a method of accounting request processing according to an embodiment of the present invention.

FIG. 2 is a flow diagram illustrating a method 200 of accounting request processing according to an embodiment of the present invention. At START is it is presumed that the necessary hardware and software components are present and operational according to the present invention. The process then begins with the receipt of an accounting request (step 205). In a network operating according to a Diameter protocol, an accounting request is referred to as an ACR. For convenience, this embodiment will be described in these terms while understanding that the present invention may be similarly applied in analogous networks. Note that the network may employ many protocols; herein "operating according to a Diameter protocol" refers to the communications involved in the embodiment being described.

In this embodiment, an ACR may be a Start, Stop, or Interim ACR. In general, an accounting request is a message sent by a network element, for example one including a CTF, that typically has responsibility for permitting a service to be provided and monitoring the provision. Rules and policies installed at this element typically govern the terms of providing the service and the reporting requirements. In this embodiment, an ACR is sent when provision of a service begins—the Start ACR, and when it terminates—the Stop ACR. Here it is noted that many elements (refer for example to FIG. 1A) may each send ACRs related to the same session, including Start and Stop ACRs.

If some time passes between start and termination of the session, Interim ACRs may be sent to indicate that provision of the service is ongoing, and to report how much of the service has been provided to this point. This may occur, for example, during a voice call. In addition, the CTFs may be set up to report by sending an Interim ACR, for example, any time there is a change in the service (such as change of QoS), a change in media (such as inclusion or exclusion of a CODEC), a change in radio access technology (such as a changeover from UMTS to GPRS, from IMS to WiFi etc.), or upon exceeding certain counts (such as volume of data on the uplink or downlink, a fixed time interval, a number of changes that have occurred since the session accounting report began).

In this embodiment, when Interim ACRs are received on the CCF and assigned to a queue at step 245, a partial CDR is created. This partial CDR continues to aggregate session-related ACRs on a per-CTF basis. Note, however, that there may be no Interim ACRs sent with respect to an event-based service, such as a content download or communication session of relatively-short duration; receipt of Interim ACRs is not a requirement of the present invention.

For the purpose of describing the present invention, the Start, Stop, and Interim ACRs that are associated with the provision of the a single service, regardless of the type, are referred to as "session-related" ACRs. Session-related ACRs may arrive from one or many CTFs (or other components generating ACRs in a particular implementation). Note also that, as mentioned above, the invention may be implemented in other environments and in that case the designation or label of such messages may vary. In this embodiment, a Stop ACR is the accounting request that indicates creation of the session CDR, including aggregation and correlation, for session-related ACRs.

In this embodiment, aggregation processing results in a per-CTF CDR, that is, a report representative of the ACRs sent from a particular CTF. Each CDR is created by intelligently aggregating the ACRs, if any, per session on a per-CTF basis. Correlation processing results in a per-session CDR, which is created by intelligently combining per-CTF CDRs in a format desired by the operator.

In the embodiment of FIG. 2, when an ACR is received, a determination is made as to whether it is a Stop ACR (step 210). If not, it is simply stored in an ACR database (step 215). If it is a Stop-type ACR, then the session-related ACRs are retrieved (step 220) to commence creation of a CDR. Here it is noted that the provision of a given service may involve only two ACRs, or it may and often does involve a great many. Note also that in other embodiments, some other mechanism may be used to trigger the start of the creation process. In the embodiment of FIG. 2, the AVPs associated with the session-related ACRs are examined (step 225). Attribute-value pairs (AVPs) are fields within the ACR that contain values representing various characteristics of the service provided and the monitoring element. Some AVPs may be required by protocol, while others are optional and may be used in various ways from network to network.

In the embodiment of FIG. 2, the source of the ACRs is then determined (step 230). As mentioned above, the source is typically the network element that is monitoring the service provision. In many networks, however, ACRs are used for other purposes as well, and the source of the ACR may be an indication of the purpose for which the ACR was sent. In some IMS networks, for example, ACRs from the S-GW and the HSGW may be used for a purpose other than billing, such as call tracing, monitoring network performance, fault management, and other network diagnostics or analysis.

In this embodiment, determining the source of the ACR includes both determining the type of network element (see, for example, FIG. 1A) and subtype. For example, in the standard protocol 3GPP TS 32.299 900, values set in AVP 862 (Node Functionality) of the ACR indicate the network element that sent it as follows:

| Value | Source |
|---|---|
| 0 | S-CSCF |
| 1 | P-CSCF |
| 2 | I-CSCF |
| 3 | MRFC |
| 4 | MGCF |
| 5 | BGCF |
| 6 | AF |
| 7 | IBCF |
| 8 | S-GW |
| 9 | P-GW |
| 10 | HSGW |

Of course, this listing is exemplary; in embodiments operable according other protocols or version of protocols, the values and sources may vary.

In the embodiment of FIG. 2, a second AVP is also used, for example AVP 2064 (Node-ID). The values used in this second AVP are currently operator-set, enabling each operator to establish subtypes for use in implementing the present invention (although they may also be useful for other purposes as well).

In this embodiment, a processing track is then determined for the ACR (step 235), that is, for the Stop ACR and any session-related ACRs. The processing track will dictate a minimum processing rate for the ACR. In accordance with this embodiment of the present invention there are at least two processing tracks, with one having a processing rate that is faster relative to the other. Herein, processing rate refers to the maximum tolerable delay in processing the ACR. Processing refers to producing a correlated CDR or analogous report for use in billing for the service associated with the ACRs.

The inventors have discovered that the ACR correlation processing burden on the network is in many cases a function of the processing rate, with faster rates resulting in a higher burden. For some ACRs, a high processing rate is necessary. The present invention, however, provides for a manner of discriminating among AVPs to permit some to be processed at a different rate with the aim of lowering the overall processing burden. Note, however, that no particular result is required unless claimed explicitly in a particular embodiment.

In a preferred embodiment, ACRs may be "colored" at the originating elements to indicate that they should all be queued in the same queue with other ACRs of the same color. Color may be assigned, for example, using values set in optional AVRs. In this case, the color will be discovered when the AVPs are examined at step 225.

In the embodiment of FIG. 2, the processing track determination is based on one or more factors set forth in the processing track policy rules. The processing track is determined by comparing one or more ACR characteristics to the processing track policy.

In a preferred embodiment, the determination is a function of one or more of source type, source subtype, and whether the source subtype or some other optional field in the ACR contains a value at all. In the preferred embodiment referred to above, rules relating to assigned colors may be included in the processing track policy rules.

As just one example, as mentioned above, ACRs from the S-GW or the HSGW (see, for example, FIG. 1A) may be sent for purposes other than billing. In this embodiment, ACRs having a value in AVP 862 associated with either of those may be associated with a faster track, while others, which are in this example assumed to be associated with a normal billing process, are assigned to a slower track. In the latter case, the slower track should result in acceptable performance while placing some of the ACRs on the slower track ultimately reduces the overall processing burden imposed.

In this embodiment, this differential ACR processing is executed by assigning each ACR to an appropriate queue (step 245). Each queue is associated with a processing rate. Again, herein processing rate refers to the specified maximum delay that is associated with correlating the ACRs and producing a CDR. Again, however, meeting that specified rate is not a requirement of the present invention. In some embodiments, the processing rate associated with each queue may be variable; in this embodiment it remains fixed.

In the embodiment of FIG. 2, prior to assigning the ACR to a queue, the backlog of at least one queue is determined (step 240). The reason for this is so the queue backlog condition can be taken into account in assigning the ACR to a queue at step 245. This operation is not performed in all embodiments, and in this embodiment, it may be omitted as well, either for specific ACRs or altogether. When performed, however, it may allow slow track ACRs to be processed in a queue having a higher processing rate if the backlog in that queue is below a certain threshold. In some embodiments, the backlog of only a single queue is determined, for example the one associated with the fastest processing rate. In a preferred embodiment, the backlog of the faster queue and the slower queue are determined, and a comparison is used prior to assigning the ACR to a queue. For example, while a slow-track ACR may be assigned to a faster queue if its backlog is below a certain threshold, the slower queue may be used anyway if its backlog is also low.

The discussion above presumes the presence of two queues, but in some embodiments there may be more than two. In this case there may be a different processing rate associated with each queue, or some queues may apply the same processing rate as at least one other queue. The queues may then be loaded according to the backlog determination of step 240, or, for example, by the source type or subtype indicated in an AVP associated with the ACR. Of course, both considerations may be used in combination.

In the embodiment of FIG. 2, after it is assigned to a queue the ACR (along with its related ACRs) is correlated into a CDR for use in billing the subscriber (step 250). This will be done as it is reached in the queue to which it has been assigned. The process then continues as additional ACRs are received.

As shown in FIG. 2, at least one and preferably all queues are monitored (step 255), that is, the backlog of each monitored queue is determined periodically even when an ACR is not being assigned as in step 240. The period for performing this monitoring may be set or varied by the network operator. It may also vary automatically. For example, if a queue backlog determination was just made in the process of assigning an ACR, it need not be immediately redone. As another example, if the backlog level does not appear to be changing over time, the period between each determination may be lengthened. Where the backlog in all queues is monitored, as is expected to be the case in most implementations, each queue does not have to be monitored at the same time.

When additional queue backlog information becomes available, a determination is made whether ACRs already in queue should be re-assigned (step 260). If not, the process simply continues with periodic monitoring according to the scheme established by the network operator. If, on the other hand, a threshold is reached in one or more queues indicating that some ACR's should be reassigned to another queue, then a reassignment (step 265) is executed, and the ACRs that have been reassigned are correlated at step 250 when they come up for processing their new processing queue. It is preferred, however, that no ACRs be reassigned if processing has begun for other ACRs of the same color, and that any reassignment include all queued ACRs of the same color. Once the CDR is produced (and, in most cases, correlated), the process simply continues as additional ACRs are received.

In an alternate embodiment (not shown), instead of or in addition to performing processing queue reassignment, the processing rate for one or more queues is adjusted up or down depending on the detected backlog of one or more queues. This may be accomplished by shortening the process cycle for a given queue, that is, by waiting less time after the processing of one ACR until the processing of another.

If a multi-core processor capable of running multiple threads is being used, the processing rate may be set and varied by assigning and reassigning the number of threads assigned to each queue. The number of threads assigned to different queues can be derived based on the CDR production delay tolerances. For example, the proportion of processing threads for Fast Track:Normal Track could be 16:1, assuming the processing needs are determined to be the same for each track under the delay tolerance parameter values assigned to each track. This follows from:

(Normalized processing needs for each ACR for the Fast Track*Number of ACRs sent to the Fast Track)/(N_FT*Normalized processing time available per thread not blocked for I/O)=(Normalized processing needs for each ACR for the Normal Track*Number of ACRs sent to the Normal Track)/(N_NT*Normalized processing time available per thread not blocked for I/O)

Where,

N_FT stands for number of threads assigned for the Fast Track and

N_NT stands for number of threads assigned for the Normal Track

In case the backlog of the queues shows to be increasing over time, even after re-assignment of ACRs from fast-track queue(s) to normal-track queue(s), it is apparent that the CCF is experiencing an overload condition. There are available methods to lessen the load conditions in such case, which include, among other methods, declaring an overload for all new sessions, such that all new sessions are directed to an alternate-peer, or declaring an overload for all new as well as existing sessions, which would force the sending entities (CTFs) to seek alternate peers for sending the ACRs.

Figure 2A:
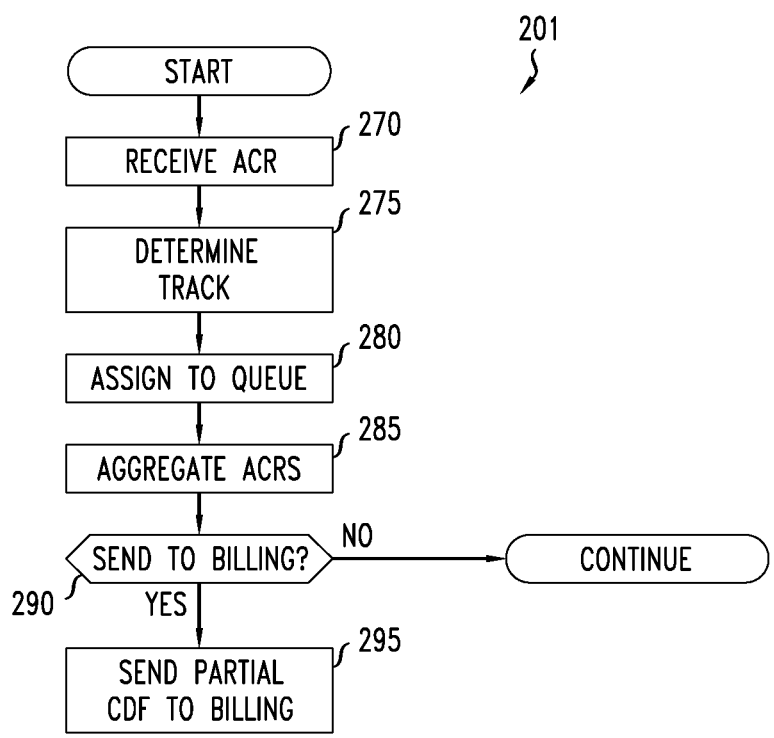
FIG. 2A is a flow diagram illustrating a method of accounting request processing according to another embodiment of the present invention.

FIG. 2A is a flow diagram illustrating a method 201 of accounting request processing according to another embodiment of the present invention. At START is it is presumed that the necessary hardware and software components are present and operational according to the present invention. The process then begins when an ACR is received (step 270). Again, this may be an ACR received from a CTF in a CCF, but it may also apply to analogous components differently configured network. Likewise, the ACR may be an accounting request sent according to the Diameter protocol, but may also be an analogous accounting-related message generated under a different scheme. When the ACR arrives, the appropriate processing track is determined (step 275). This determination may be made based on the factors described above in describing method 200.

In this embodiment, when a track has been determined the ACR is assigned to a queue (step 280). This determination is made based on the track associated with the ACR but may be a factor of other criteria as well. Once an ACR is assigned to a queue, it is aggregated into a partial CDR (step 285). In this embodiment, the partial CTR will include the session-related ACRs received from a single source; other session-related ACRs, that is, those from other sources, if any, are aggregated into other per-source CDRs. Note that in this embodiment, there is no requirement that all session-related ACRs related to the same session be assigned to the same queue.

In the embodiment of FIG. 2A, a determination is then made (step 290) whether to send the partial (per-source) CDF to the billing domain. In many implementation, this determination will be based on whether the ACR received at step 270 is a Stop ACR or similar accounting request, but in some cases the determination may be based on other factors. For example, the partial CDR may be sent if a certain pre-determined time has passed since the partial CDR was first created. If it is determined that the partial CDF should be sent to billing, then it is sent (step 295), usually immediately, though in some embodiments there may be a reason that some delay is desirable. If a determination is made at step 290 that the partial CDF is not to be sent, then the process simply continues as additional ACRs are aggregated into the partial CDR prior to transmission. Note that the determination at step 290 may be made periodically (not shown) even if no additional ACRs are received.

Note that in this embodiment, the aggregated partial CDRs are send to the billing domain for mediation without being fully correlated into a session CDR. This step may be added in an alternate embodiment (not shown in FIG. 2A). Note also that the methods 200 and 201 of FIGS. 2 and 2A, are illustrative of a particular embodiment, and some variation is possible within the spirit of the present invention. Operations may be performed in any logically-consistent sequence unless otherwise specified in a particular embodiment. In addition, operations may be added and, in some cases omitted, in alternate embodiments (not shown).

In this manner the present invention provides a manner of processing accounting requests that is ultimately expected to reduce the processing burden and may be permit a reduction in the quantity of deployed hardware and software.

Figure 3:
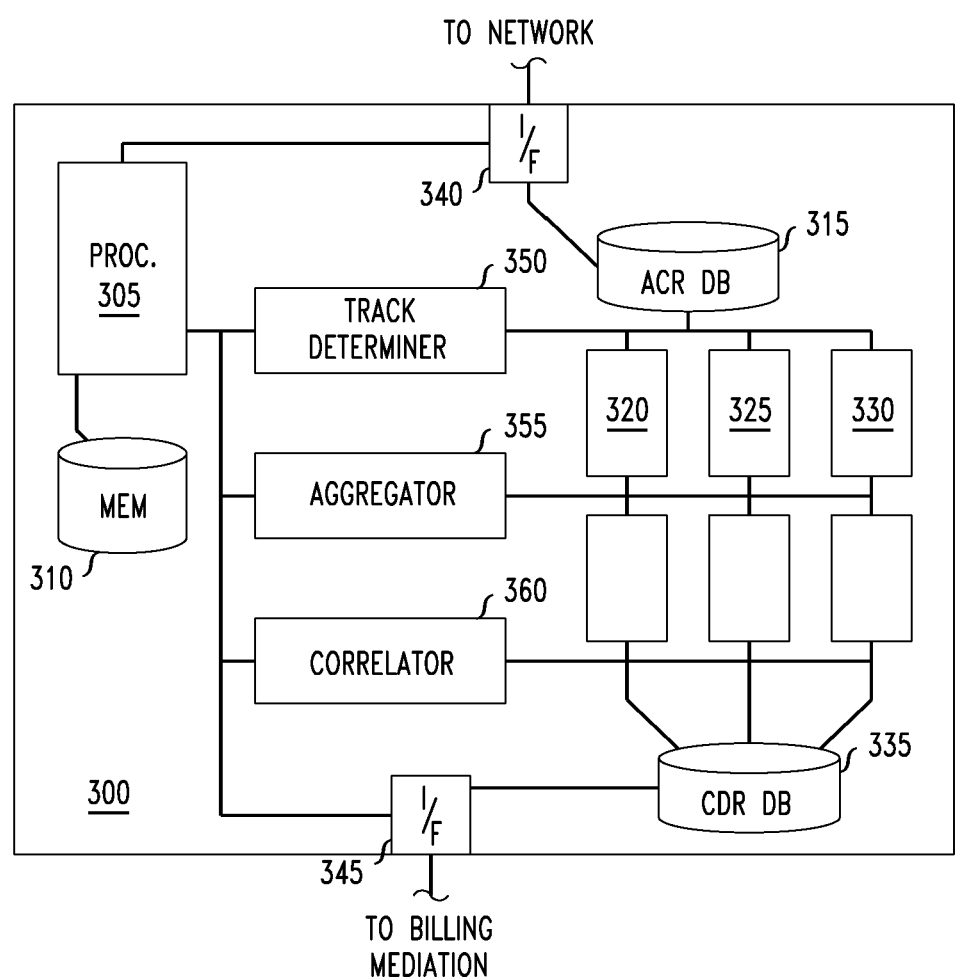
FIG. 3 is a simplified block diagram illustrating selected components of a network element according to an embodiment of the present invention.

FIG. 3 is a simplified block diagram illustrating selected components of a network element 300 according to an embodiment of the present invention. In this embodiment, network element 300 includes a processor 305 for, among other things, executing instructions stored as software on memory device 310 and controlling operation of the components of network element 300. Memory device 310 is a physical, non-transitory data storage medium. A network interface 340 is available for sending and receiving communications. As depicted in FIG. 3, network interface 340 may be representative of multiple communication ports. A separate interface 345 is illustrated for sending CDRs to billing mediation, though in implementation network interface 340 may be used for this operation instead.

In accordance with this embodiment of the present invention, network element also includes an ACR data base 315 for storing ACRs as they are received from other network devices, for example service element 120 shown in FIG. 1. Also shown separately is processing track determiner 350 that, as described above, is operable to examine received ACRs and determine an appropriate processing track with reference to differential processing policy rules, which may be stored, for example, in memory 310.

In this embodiment, queues 320, 325, and 330 are available for queuing ACRs for which a processing track has been determined. Each of the three queues uses facilitates processing the ACRs at a different rate. Once placed in a queue, the ACRs are aggregated using aggregator module 355 to produce partial CDRs at the rate assigned (or reassigned) to a respective queue. Fully correlated CDRs are produced by the CDR correlator 360 when the related session has been terminated, and sent via interface 345 to a billing mediation system if used for charging, or to an entity associated with the purpose for which the ACR was generated.

Network element 300 may be, for example, a CCF in an IMS network. In other embodiments, however, some of the components described above in reference to FIG. 3 may be distributed across a number of physical components. Of course, network element 300 may, and generally will, include other components than those illustrated in FIG. 3.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of account request processing in a communication network, comprising:
    receiving an accounting request;
    determining a processing track for the accounting based at least in part on the presence or absence of an attribute-value pair (AVP) in the accounting request;

assigning the accounting request to one of a plurality of processing queues based on the processing track determination.

2. The method of claim 1, wherein the plurality of processing queues comprises at least a queue for faster processing relative to the remainder of the plurality of queues.

3. The method of claim 2, wherein the processing rate of at least one queue of the plurality of queues is variable.

4. The method of claim 1, further comprising creating a charging record incorporating the accounting request.

5. The method of claim 4, further comprising incorporating at least a second accounting request into the charging record.

6. The method of claim 2, further comprising monitoring at least one queue of the plurality of queues to determine its backlog.

7. The method of claim 6, further comprising adjusting the processing rate of at least one queue.

8. The method of claim 7, wherein adjusting the processing rate of at least one queue comprises increasing the processing rate of a slower queue when the backlog of a faster queue has reached a predetermined threshold.

9. The method of claim 7, wherein adjusting the processing rate of at least one queue comprising increasing the processing rate of a slower queue when the backlog of the slower queue has reached a predetermined threshold.

10. The method of claim 6, further comprising analyzing the backlog of a first queue relative to the backlog of a second queue.

11. The method of claim 10, further comprising re-assigning at least one accounting request to a different queue based on the results of the comparison.

12. The method of claim 1, further comprising determining the source of the accounting request, and wherein the processing track determination is based at least in part on the source of the accounting request.

13. The method of claim 12, further comprising determining a network element type associated with the accounting request, and wherein the processing track determination is based at least in part on the network element type.

14. The method of claim 13, wherein the network element type is assigned to the network element by the network operator.

15. The method of claim 13, wherein the at least a portion of the network is operable according to a Diameter protocol, and wherein the network element type is communicated by the AVP.

16. The method of claim 15, wherein the AVP is an optional AVP.

17. The method of claim 15, wherein the accounting request is received in a CCF.

18. The method of claim 17, wherein the accounting request is correlated into a CDR.

19. A network element for processing accounting requests, comprising:
    a processor for controlling components of the network element;
    a memory device accessible to the processor;
    a network interface for receiving accounting requests from other network components;
    a processing track determiner for associating ACRs with a processing track according to policy rules installed in the network element based at least in part on the presence or absence of an attribute-value pair (AVP) in each accounting request; and
    a plurality of processing queues into which ACRs are placed according to the processing track assigned.

20. A method of account request processing in a communication network, comprising:
    receiving an accounting request;
    determining a processing track for the accounting;
    assigning, based on the processing track determination, the accounting request to one of a plurality of processing queues, the plurality comprising at least a queue for faster processing relative to the remainder of the plurality of queues; and
    monitoring at least one queue of the plurality of queues to determine its backlog.

21. A network element for processing accounting requests, comprising:
    a processor for controlling components of the network element;
    a memory device accessible to the processor;
    a network interface for receiving accounting requests from other network components;
    a processing track determiner for associating ACRs with a processing track according to policy rules installed in the network element and for assigning, based on the processing track association, each ACR to one of a plurality of processing queues, the plurality comprising at least a queue for faster processing relative to the remainder of the plurality of queues, wherein the processor monitors at least one queue of the plurality of queues to determine its backlog.

* * * * *